Dec. 13, 1932.  S. WILEY  1,890,962
PARACHUTE FOR ILLUMINATING FLARES
Filed July 26, 1930  2 Sheets-Sheet 2
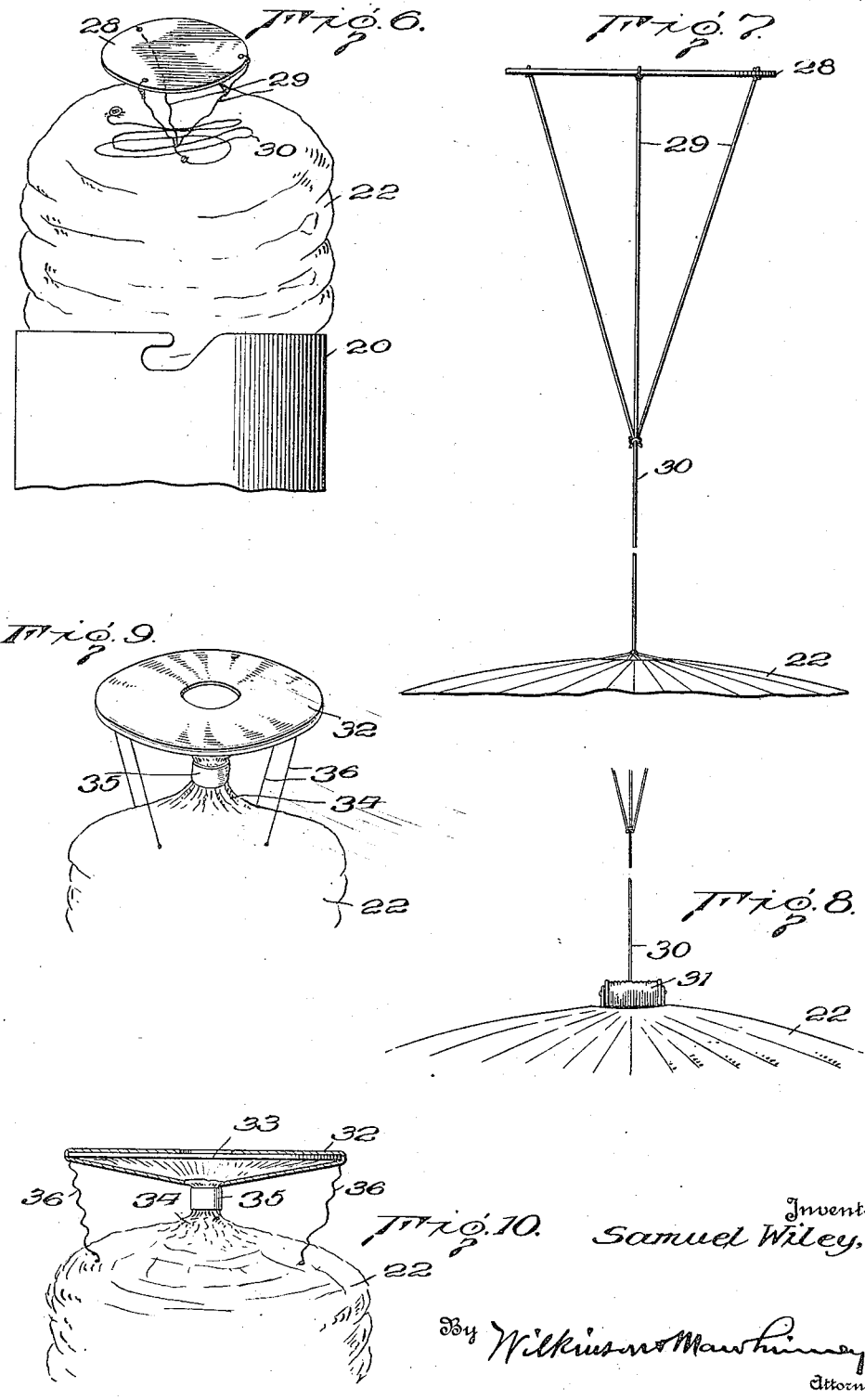

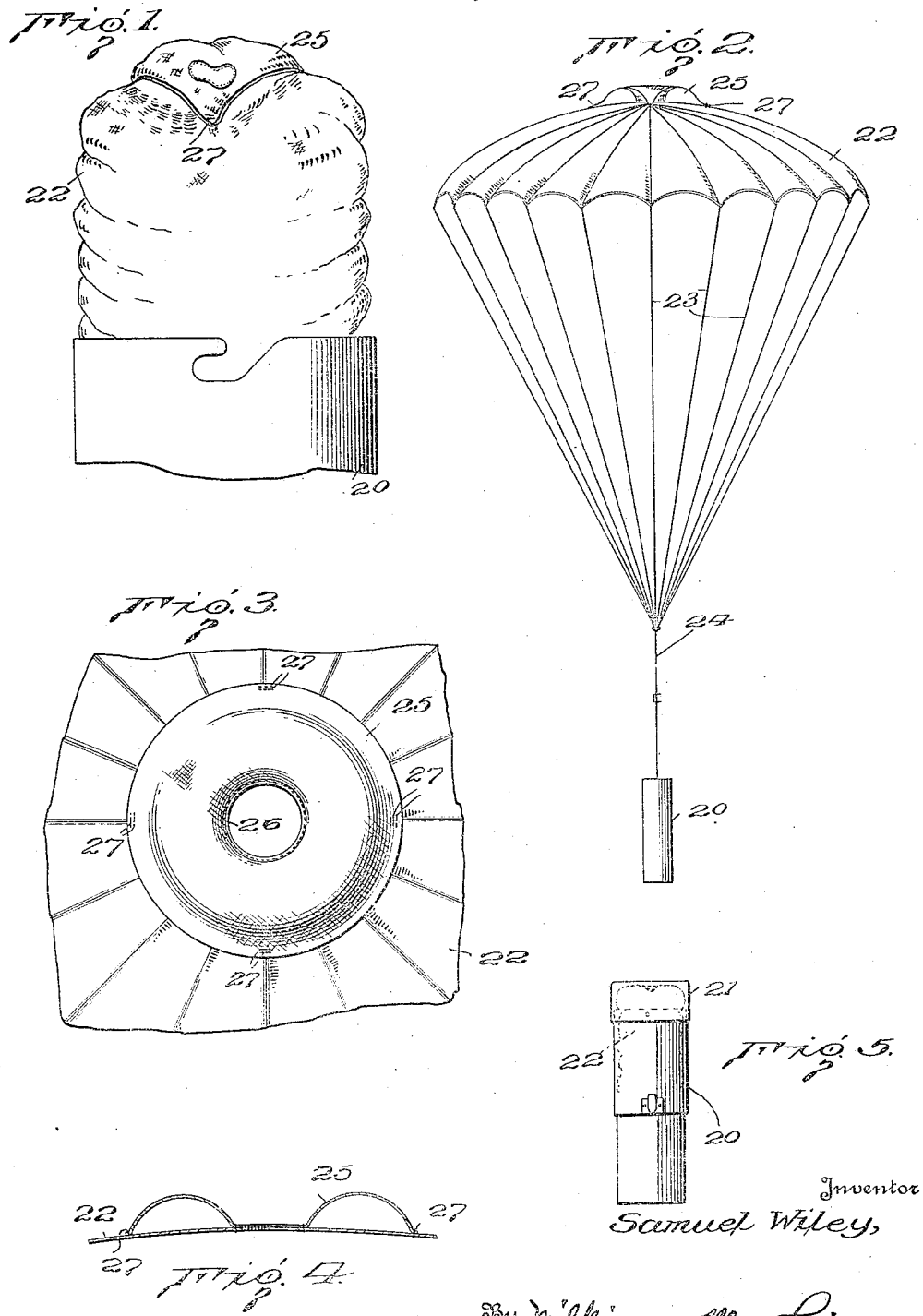

Patented Dec. 13, 1932

1,890,962

UNITED STATES PATENT OFFICE

SAMUEL WILEY, OF METUCHEN, NEW JERSEY

PARACHUTE FOR ILLUMINATING FLARES

Application filed July 26, 1930. Serial No. 470,977.

The present invention relates to illuminating flares such as may be used on aircraft to be dropped therefrom at night for the purpose of lighting the terrain or water beneath the aviator so that he may make a safe landing in unknown territory, or for night observation, photography and the like.

An object of the present invention is to provide means for insuring that the parachute will be withdrawn from its case by air resistance alone as the flare descends when released from the aircraft without the use of pilot parachutes, pull out cords, and the like.

Another object of the invention is to provide improved means by which may be delayed and timed the opening of the parachute after the flare has been released from the aircraft.

A still further object of the invention is to provide a parachute of such construction that it will be automatically released from the container by the air resistance alone and without the use of pilot parachutes, pull-out cords, and the like.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a fragmentary side elevation of the upper end of a flare casing showing a parachute partly withdrawn therefrom.

Figure 2 is a side elevation of the parachute completely withdrawn from the casing and fully open.

Figure 3 is a fragmentary top plan view of the parachute in open position and showing one form of drag applied thereto.

Figure 4 is a transverse section taken through the same.

Figure 5 is a side elevation of a flare showing in dotted lines the parachute in folded position and extending into the cap of the flare.

Figure 6 is a view similar to Figure 1, but showing a modification in the construction of the drag.

Figure 7 is a side elevation of the same showing the drag in extended position and showing a portion of the parachute open.

Figure 8 is a fragmentary side elevation of the upper portion of the parachute showing a modified construction of the drag connection with the parachute.

Figure 9 is a fragmentary perspective view of the upper portion of a parachute, showing a further modified form of drag therefor, and Figure 10 is a vertical central section taken through the same.

Referring to the drawings and first to the form of the invention disclosed in Figures 1 to 5, 20 designates a parachute casing provided in the usual manner with a cap 21 of suitable depth on its upper end adapted to be removed by the releasing means of an aircraft for exposing the upper portion of a parachute 22 which is folded and housed within the casing 20.

From Figure 5 it will be noted that when the cap 21 is in place the upper portion of the parachute 22 extends up into the cap. When the cap 21 is removed, as shown in Figure 1, the upper portion of the parachute is exposed to the surrounding air so that the air current created by the speed of the aircraft and the falling of the flare may act upon the upper portion of the parachute for withdrawing it from the casing 20.

The parachute 22 is of the usual form and provided with shrouds 23 which are converged downwardly and connected to the upper end of a suspension cord 24, the latter being attached at its lower end portion to the casing 20 in any suitable and well known manner.

For the purpose of insuring the withdrawal of the parachute 22 from the case 20 at the desired time interval from the release of the flare, the parachute 22 is provided at its upper central portion with a drag 25. In the present instance the drag 25 is shown in the form of a flexible sheet of silk or other suitable material or composition and it is of any desired marginal configuration.

The sheet or drag 25, as shown in Figure 3, may be stitched at its central portion by a line of stitches 26 to the upper central portion of the parachute 22 on the upper side thereof. The outer marginal portion of the drag or flexible sheet 25 is attached at suitable spaced apart points by stitches 27 to the body portion of the parachute 22 in desired spaced relation from the circular line of stitches to pucker or bulge out the portions of the drag which lie between the spaced stitches 27.

The drag 25, being disposed at the uppermost portion of the parachute 22, is exposed to the air immediately the cap 21 is removed from the case 20 so that the air current passes beneath the bulged portions of the drag 25 and is pocketed therein with the result that the drag is brought into place immediately and with considerable force to withdraw the body portion of the parachute 22 out of the upper end of the case 20.

It is, of course, understood that the drag 25 may be constructed otherwise than of flexible material. The drag also may be given any desired configuration or construction in order that the air may pocket therein and effectually draw the parachute 22 out of the case.

Referring now to the construction shown in Figures 6 and 7, the drag is in the form of a disc 28 which may be of aluminum, tin or other suitable material, or even cardboard, dependent upon the size of the parachute and the pressure to be exerted upon the drag.

The disc 28 is provided with cords 29 which are secured at their upper ends to the marginal portions of the disc 28 in spaced relation thereabout, the cords 29 being carried downwardly to a common connecting cord 30 which is secured to the upper central portion of the parachute 22.

The cord 30 may be of any desired length in order to determine the time period between the release of the flare and the opening of the parachute 22. The connecting cord 30 may be coiled, as shown in Figure 6, upon the top of the parachute 22 and beneath and about the drag disc 28. As soon as the cap of the case 20 is removed, the air current passes beneath the disc 28 and the latter is carried upwardly away from the case 20 until the connecting cord 30 is entirely drawn away from the parachute and is drawn taut, such as shown in Figure 7. At this time the parachute 22 is then withdrawn from the case 20 and subjected to the air current and is immediately opened thereby.

As shown in Figure 8, the connecting cord 30 may be of any desired length, and when the cord is of too great a length to be conveniently coiled or folded into the top of the flare, the parachute 22 may be provided with a spool 31 about which the cord 30 is wound. It is apparent that as the drag disc 28 is carried away from the parachute 22 by the pressure of the air, the connecting cord 30 is payed-out from the spool 31 until the full length of the connecting cord 30 is exposed, whereupon the parachute 22 is withdrawn into position for use.

Another modification of the drag is disclosed in Figures 9 and 10 and wherein the intermediate portion of the parachute 22 is bulged or puckered upwardly above the body portion of the parachute and flattened to provide a drag 32 which may be held to shape in any suitable manner, as by a disc 33 of cardboard or other suitable material, with sufficient inherent stiffness to maintain the drag in general disc form, or which may be held to shape by making the reinforced top portion of the parachute of a stiffer material than usual.

The body of the parachute 22, beneath the flattened bulged portion forming the drag 32, is gathered in beneath the drag to provide a narrow neck portion 34 which is held in shape by a frangible band 35 of paper or the like capable of being opened or torn by the action of the wind in spreading the bottom portion of the parachute 22.

The marginal edge portion of the drag 22 may be provided with a plurality of attaching cords 36 which extend downwardly to the body portion of the parachute and are adapted to maintain the drag 32 in proper position above the neck 34 and to take up the pressure of air which may be unequal at the sides and beneath the drag 32. These cords 36 may of course be of such construction and mounting as to not interfere with the proper spreading of the parachute 22 after the latter has once been withdrawn from the case 20. The cords 36 may be entirely omitted, if desired.

It is apparent that when the cap 21 is removed from the case, the air has access to the drag 32 about the neck 34 and the cords 36 hold the drag 32 from turning into an edgewise direction in the air current. The drag 32 thus exerts pressure upon the upper end of the parachute 22 and withdraws it from the case.

When the air is admitted to the underside of the parachute 22, the latter is spread open with the result that the band 35 is removed from the neck and the gathered neck 34 spreads and gradually absorbs the configuration of the drag 32, with the result that the drag disappears, the disc 33, if used, is then free to fall out of the parachute, and the parachute may then function in a normal manner.

It is obvious that various changes and modifications may be made in the details of construction and design of the above specifically described embodiments of this invention without departing from the spirit thereof, such changes and modifications being restricted only by the scope of the following claims.

I claim:

1. A parachute having its intermediate portion puckered substantially to provide a drag element and gathered inwardly beneath the element to provide a neck, and means for removably holding the gathered portion together.

2. A parachute having its intermediate portion puckered substantially to provide a drag element, means for stiffening the drag element, and means for removably holding the puckered portion in shape.

3. A parachute having its intermediate portion puckered substantially to provide a drag element and gathered inwardly beneath the element to provide a neck, means for removably holding the gathered portion together, and means between said drag element and the body portion of the parachute for holding the drag element at substantially right angles to the axis of the parachute.

3. A parachute having its intermediate portion puckered upwardly and flattened to provide a drag element and gathered together beneath the drag element to form a connecting neck, means for releasably holding the gathered portion together, a disc inserted in said upwardly puckered and flattened portion to maintain the drag element in shape, and connecting cords arranged between the marginal edge portion of the drag element and the intermediate body portion of the parachute.

5. A flare having a casing open at one end, a cap removably fitted on the open end of the casing for closing the same, and a supporting parachute enclosed at its lower end portion in the casing and projecting at its upper end portion beyond the open end of the casing, said cap being of a depth to receive and enclose the projecting upper end portion of the parachute and adapted when removed from the casing to expose said upper projecting end portion of the parachute to the air for the withdrawal of the parachute from the casing by air pressure.

SAMUEL WILEY.